Patented Mar. 27, 1945

2,372,602

UNITED STATES PATENT OFFICE 2,372,602

PROCESS FOR PREPARATION OF PENTAERYTHRITOL

Grafton R. Owens, Dayton, Ohio, assignor to Monsanto Chemical Company, a corporation of Delaware No Drawing. Application July 8, 1941, Serial No. 401,507

5 Claims. (Cl. 260—635)

This invention relates to the preparation of pentaerythritol. The principal object of this invention is to provide an improved process whereby increased yields of this important tetrahydric alcohol may be obtained.

It is another object to provide a process whereby pentaerythritol may be more easily separated from the reaction mass in which it is formed.

It has long been known that pentaerythritol could be prepared by the reaction together of from 4 to 5 mols of formaldehyde with 1 mol of acetaldehyde, the reaction being carried out in alkaline medium. From the standpoint of the mechanism of the reaction it is generally believed that 1 mol of acetaldehyde reacts first with 3 mols of formaldehyde to produce pentaerythrose, which compound then reacts with another mol of formaldehyde and water to produce the pentaerythritol together with a mol of formic acid.

The reactions may be written:

(1) $CH_3COH + 3\ HCHO \rightarrow (HOCH_2)_3 C-CHO$ (2) $(HOCH_2)_3 CCHO + HCHO + H_2O \rightarrow (HOCH_2)_4 C + HCOOH$ It is generally known that a somewhat better yield (based on acetaldehyde) of the desired product is obtained when an excess of formaldehyde is employed hence it is sometimes customary to employ a total of 5 mols of formaldehyde to 1 mol of acetaldehyde in the reacting mixture, rather than the theoretical required molar proportions of 4:1.

Since even under the most favorable conditions, the reaction employing the theoretical proportions does not go to completion, the reaction mixture will always contain some unreacted formaldehyde and in addition also formic acid which is formed as a result of reaction 2 above.

In view of the fact that the reaction is carried out in an aqueous alkaline solution, in which the alkalinity is usually supplied either by lime or sodium hydroxide, the formic acid liberated combines to form the corresponding formate of the alkali or alkaline earth metal present.

The processes hitherto employed for producing this product comprise the mixing together of the formaldehyde and acetaldehyde in the proportions stated above, after which an alkali such as lime or calcium hydrate, is added to the mixed aldehydes and the temperature maintained preferably below 40 or 50° C. In other processes the formaldehyde and lime have been treated with acetaldehyde and the reaction mixture then allowed to stand until the reaction, as shown by disappearance of formaldehyde, is completed. It has also been the practice to employ in the reaction, considerably more than 20 mols of water per mol of acetaldehyde.

I have now found that the yield of pentaerythritol may be considerably increased by employing a particular sequence of steps such as are hereinafter disclosed in which it is provided that the reaction mixture be maintained at a uniform hydrogen ion concentration within a range of pH 8.5 to 10.5 and preferably within a range of 9.0 to 9.5 during the entire course of the condensation. The control of hydrogen ion concentration is effected by the regulated addition of the alkaline condensing agent to the reaction mass. At the same time I exercise a control of the reaction itself by the addition of the acetaldehyde either as a solution in water or as a gas conducted into the solution.

Employing a low concentration of acetaldehyde at any time and working within the optimum range of hydrogen ion concentration within the solution I am able to operate at higher temperatures and considerably shorten the necessary time of reaction. Thus I may operate at temperatures as high as 80–85° which range includes the conditions under which a maximum yield is obtained under my preferred conditions.

The acetaldehyde may also be introduced into the formaldehyde containing solution as a gas, thus considerably decreasing the amount of water present. In fact I may advantageously restrict the amount of water present to less than 20 mols of $H_2O$ per mol of acetaldehyde present at the end of the reaction.

In all prior known processes, it is customary to evaporate the water from the reaction mass after completion of the reaction until a solid mass is obtained which is then treated with small amounts of water at a temperature of 80–90° to dissolve the pentaerythritol which may then be removed by hot filtration from the accompanying calcium formate. The pentaerythritol is obtained by crystallization from the filtrate. In general, however, the yields of pentaerythritol obtained are rather unsatisfactory, and in most cases considerably lower than expected.

I have investigated the recovery of pentaerythritol from solutions containing various impurities such as occur as reaction by-products and find that certain compounds have a very detrimental effect upon the crystallization of the pentaerythritol from solutions. For example, I have discovered that formaldehyde, aldol, sugars, such as glucose, various inorganic salts, such as calcium formate, sodium formate, formic acid, sodium hydroxide and sodium chloride tend to very materially increase its retention or inhibit crystallization thereof, and thereby prevent a satisfactory recovery of the pentaerythritol.

I have further discovered that if the by-products such as formaldehyde and formic acid and other impurities of the pentaerythritol synthesis reaction be removed either by distillation, steam distillation, or oxidation prior to crystallization a greatly improved recovery of the product is obtained. Accordingly I may remove formaldehyde from the reaction mass after completion of the reaction either by oxidation or by distillation. Or I may oxidize the aldehydes, organic acids and sugars present by treatment with suitable oxidizing agents in alkaline solution, without oxidizing the desired product or I may combine the distillation with the oxidation treatment.

In order to remove an alkaline earth metal such as lime or barium from the reacting mass it has been proposed to add either sulfuric or oxalic acid to the mass whereby the corresponding insoluble alkaline earth metal salt is formed which may then be removed upon filtration of the solution. Such a treatment liberates the formic acid from the formates in the reaction mass and unless the same is removed it has an adverse influence upon the subsequent recovery of the pentaerythritol by crystallization. Accordingly as an aid to the removal of the formic acid by distillation I may form a volatile ester thereof, which ester is more easily removed by distillation. Thus it is practical to readily form methyl, ethyl or propyl formate by the addition of the respective alcohols and thereafter volatilize the ester by distillation. In this way the reaction mass is freed of those constituents and the pentaerythritol thereafter readily obtained by crystallization.

Without limiting myself to the precise proportions employed I give the following example illustrating my improvements:

Example 1

As illustrating a method which may be employed for the production of pentaerythritol I first prepare three mixtures made up in proportions as follows:

(1) 361 grams of paraformaldehyde suspended in 400 cc. of water.
(2) 126 grams of acetaldehyde dissolved in 200 cc. of water.
(3) 80 grams of CaO, U. S. P., dissolved in 400 cc. of water.

The paraformaldehyde slurry is contained in a reaction vessel, heated to 80-85° C. preferably 81° C. to 83° C. by means of a jacket or water bath, the vessel being provided with an efficient stirrer, a thermometer and a reflux condenser. A colorimetric indicator such as phenol-phthalein is added to the formaldehyde solution and the acetaldehyde solution is run in through a submerged tube fairly rapidly at first but at the end very slowly. The rate of addition of acetaldehyde is conducted at such a rate that very little or no reflux occurs in the condenser. About ⅔ of the acetaldehyde is added during the first hour or the first 40% of the total time of addition and the last third in the next hour and a half. Simultaneously with the addition of the acetaldehyde, the lime solution is added to the reaction mass at a rate so as to maintain an approximately constant pH as shown by the pink indicator color.

After the reacting ingredients have all been added and the reaction has been in progress say about 2½ hours, the reaction solution is steam distilled at constant volume until about 500 cc. of distillate has been collected. The steam distillation removes a small amount of formaldehyde and considerable quantities of low boiling compounds such as aldol which latter would consume excessive quantities of oxidizing agent. Now at a temperature of 75-80° C. a 30% $H_2O_2$ solution is slowly added to the residue from the steam distillation, in order to oxidize the residual formaldehyde and other readily oxidizable compounds to acids. Simultaneously with the addition of the peroxide, lime is added to maintain the hydrogen ion concentration of the solution at the pink of phenol phthalein. This oxidation treatment removes considerable quantities of low boiling by-products and formaldehyde. The solution is now additionally concentrated, filtered while hot to remove calcium formate and the filtrate then cooled to precipitate pentaerylthritol. The mother liquor may be repeatedly concentrated and subjected to crystallization for obtaining successive crops of the product. The crystallized pentaerythritol is then washed with alcohol for the removal of impurities.

In place of hydrogen peroxide as the oxidizing agent I may employ other oxidizing agents such as permanganates, chromates and dischromates, etc., the insoluble residue from these agents being removed by filtration.

I have also found that formic acid which is formed as a by-product of the condensation reaction itself or resulting from the oxidation of formaldehyde as described above, may be removed from the reaction mass as a volatile ester. Ordinarily formic acid, because of the formation of a constant boiling mixture with water is distilled from the present mixture with great difficulty.

When removing formic acid, in the present process, I may regenerate the same from the formates present, by the addition of an acid, say sulfuric or oxalic, to the aqueous solution, which will serve to regenerate formic acid and at the same time to precipitate the alkaline earths as insoluble, readily filterable salts. To the filtrate obtained as the result of such treatment I add preferably somewhat of an excess of an alcohol such as methyl, ethyl, propyl, etc., forming the corresponding ester of formic acid in the solution. The solution is then subjected to distillation preferably with the aid of steam, and the volatile ester, together with any unesterified alcohol removed from the solution. The solution remaining is then subjected to evaporation and crystallization for the recovery of the pentaerythritol, in the usual manner.

What I claim is:

1. In the process for producing pentaerythritol by condensing acetaldehyde with formaldehyde in the presence of an alkaline condensing agent, the steps of adding acetaldehyde to a formaldehyde-water solution, and simultaneously adding said alkaline condensing agent in such amount as to maintain said solution at a pH within the range of 8.5 to 10.5 during said condensation.

2. The process defined in claim 1 in which the alkaline condensing agent is lime.

3. The process defined in claim 1 in which the alkaline condensing agent is added at such a rate as to maintain the pH of the solution within the range of from 9.0 to 9.5.

4. In the process for producing pentaerythritol by condensing acetaldehyde with formaldehyde in the presence of lime, the step of adding acetaldehyde to a formaldehyde-water solution and simultaneously adding lime at such a rate so as to maintain said solution at a pH of 8.5.

5. In the process for producing pentaerythritol by condensing acetaldehyde with formaldehyde in the presence of lime, the steps of adding acetaldehyde to a formaldehyde-water solution and simultaneously adding said lime at such a rate as to maintain said solution at a pH within the range of 8.5 to 10.5, while maintaining the temperature thereof within the range of 80° C. to 85° C.

GRAFTON R. OWENS.